A. H. TAFT.
STANCHIONS.
No. 186,767. Patented Jan. 30, 1877.
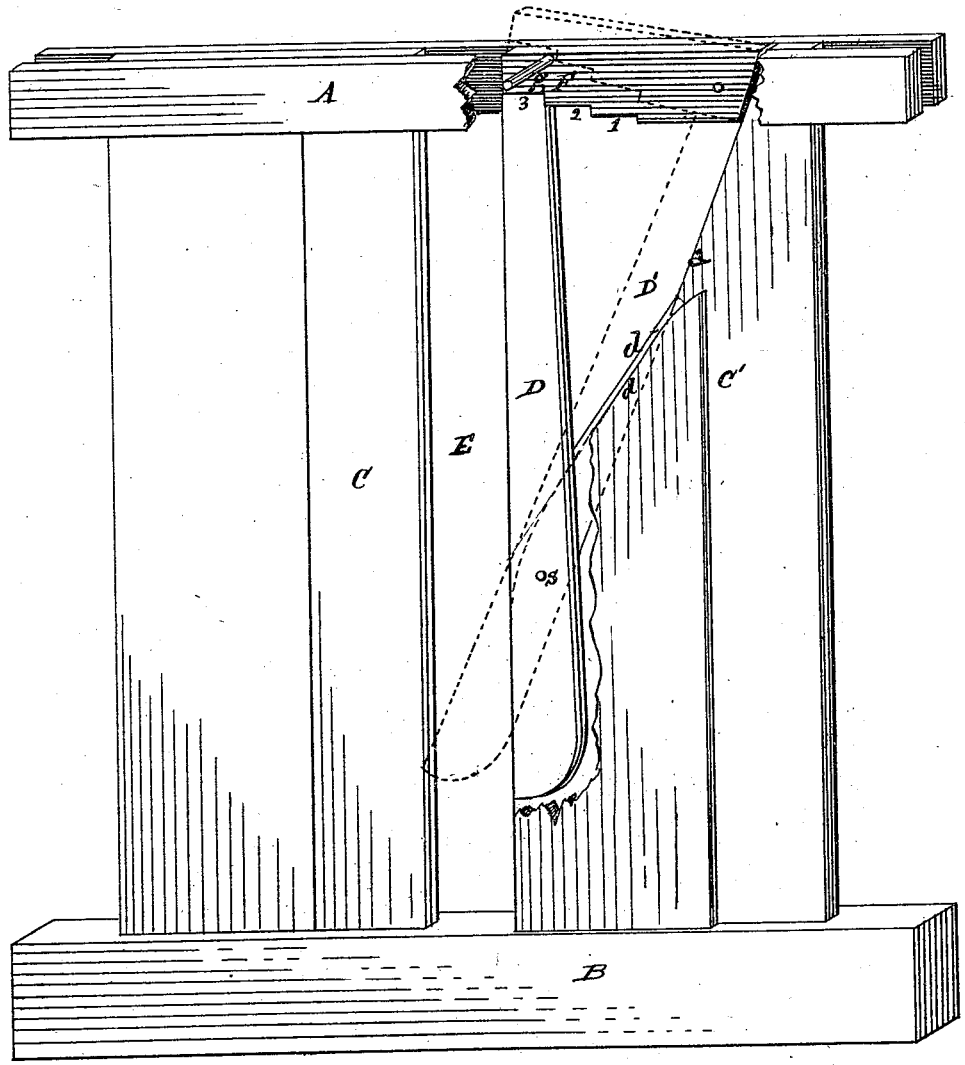

UNITED STATES PATENT OFFICE.

ALLIS H. TAFT, OF FRANKLIN, NEW YORK.

IMPROVEMENT IN STANCHIONS.

Specification forming part of Letters Patent No. 186,767, dated January 30, 1877; application filed December 19, 1876.

*To all whom it may concern:*

Be it known that I, ALLIS H. TAFT, of Franklin, county of Delaware, in the State of New York, have invented an Improved Device for Stalling Animals; and I do hereby declare that the following is a description thereof, reference being had to the accompanying drawing, forming part of this specification, which drawing represents a perspective view of the improved device, with parts broken away to illustrate the improvements in this invention.

My invention relates to a self-closing and self-locking device for stalling cattle; and consists, in one part, of the combination, with a stationary bar, of a movable tapering bar, pivoted to a second stationary bar at a point on the said movable bar that will nearly balance the same, in such a manner that when the said bar is thrown in an inclined position a slight movement of the head and neck of the animal may close the same.

The object of this part of my invention is to render the movable bar capable of being thrown from an open position to a closed one by the operation of the animal, when its head is inserted in the opening produced by the inclined position of the movable bar.

Another part of my invention relates to the combination, with a frame composed of two stationary bars and a top rail, of a movable bar, pivoted at near a balancing-point from one of the stationary bars, and a notched latch, in such a manner that when the animal inserts its head in the opening between the movable bar and the stationary bar opposite, and with its neck presses against the portion of the movable bar below its point of pivoting, so as to close said movable bar, some one of the notches in the latch may engage with the upper end of the movable bar, and hold the same in place closed. The object of this part of my invention is to secure a locking of the movable bar by the operation of the animal with the portion of the movable bar below its pivot.

To enable others skilled in the art to make and use my invention, I will proceed to describe it in reference to the drawing, and letters of reference marked thereon, the same letters indicating like parts.

In the drawing, A represents the top rail. B is the bottom rail. C is a vertical stationary bar, secured to both the top and bottom rails in a firm manner. C' is a second stationary bar, placed opposite the bar C, and at a distance therefrom sufficient to admit the neck of the animal to be stalled. The upper portion of the bar C' is made with an incline face-edge, a, as shown, so as to form, with the face-edge b of the stationary bar C, an opening of the form of a right-angled triangle of sufficient extension to freely receive the head of the animal to be secured. Pivoted to the bar C', or upon the pieces d, secured to the same, is the movable stanchion-bar D, made with a tapering form, with its heaviest end downward, and the pivot s at a point in the said movable bar that may nearly balance the same, as shown in the drawing. Being thus pivoted the said stanchion may be readily made to assume the position of full lines D, when the neck-space E between the said stanchion and its connecting-bar C and the bar C will be made of one uniform width, or may be made to assume the position of dotted lines D', when the upper part of the neck-space E will be enlarged in its capacity, and rendered capable of receiving the head of the animal to be stalled, and the part of the lower portion of the neck-space below the pivot s be partly closed by the wide and lower end of the stanchion-bar projecting into the same in an oblique direction. A portion of the bar C' below the pivot s is cut out and boxed at the sides by the pieces d, from which the stanchion-bar is pivoted, so as to form a recess of sufficient capacity to receive the wide end of said stanchion, when thrown to an upright position, as shown. Pivoted to the top rail A, and in a slot central in the same, and vertically over the bar C' and stanchion D, is the latch F, made with a series of notches, 1, 2, and 3, and a lifting-handle, g, by which the said latch may be raised.

The manner in which the several parts of this invention operate is as follows: The latch F is to be thrown up to release the stanchion-bar D, when it may be thrown to the position shown by dotted lines D', with the upper portion resting on the inclined face-edge of bar C', and the lower and heavy end projecting in an oblique manner into the neck-space E, in which position the device is ready to receive the head and neck of the animal, when the stanchion will be ready for operation for closing the said opening. When the head of the animal is thrust through the right-angled triangular opening, and its neck is moved against the face-edge of the lower portion of the stanchion-bar D, the said bar may be thrown from the inclined position D' to an upright position, and the latch F will be permitted to fall, so that some one of its notches 1, 2, or 3 may engage with the upper end of the said bar and be held. If the movement of the neck of the animal against the lower end of said bar is not at first of sufficient force to throw the stanchion-bar to a full upright position that notch 3 cannot engage with the upper end of said bar, notches 1 or two may engage with it, so as to temporarily hold the said bar until a more forcible movement of the neck of the animal may fully close the said bar, and notch 3 of the latch F be brought to engage with the end of the said stanchion-bar.

It may be readily seen that by the improvements in this invention, when the animal is released, the stanchion-bar may be set to the incline shown by dotted lines D', that the device may be in readiness for receiving the head and neck of the animal; and that when the animal is driven in its stall, and thrusts its head into the upper enlarged opening, the natural movement of the animal with its head and neck may close the stanchion-bar and latch-lock the same secure without requiring the aid or any operation of an attendant.

Having described my invention, what I claim, and desire to secure by Letters Patent, is—

1. The combination, with the bar C, of a movable stanchion-bar, D, pivoted to the bar C' at a point on said stanchion that may nearly balance the same, and the inclined face-edge $a$ of bar C', substantially as and for the purpose set forth.

2. The combination, with a frame composed of the bar C, top rail A, and bar C', having the inclined face-edge $a$, of the stanchion-bar D, pivoted at near its balancing-point upon bar C', or pieces $d$, secured to said bar, and notched latch F, substantially as and for the purpose set forth.

ALLIS H. TAFT.

Witnesses:
AMOS DOUGLAS,
CHAS. A. DOUGLAS.